US 11,425,374 B2

(12) United States Patent
Yang et al.

(10) Patent No.: US 11,425,374 B2
(45) Date of Patent: Aug. 23, 2022

(54) DEVICE AND METHOD FOR CODING VIDEO DATA

(71) Applicant: FG Innovation Company Limited, Tuen Mun (HK)

(72) Inventors: Yu-Chiao Yang, Hsinchu (TW); Po-Han Lin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 148 days.

(21) Appl. No.: 16/813,658

(22) Filed: Mar. 9, 2020

(65) Prior Publication Data

US 2020/0296363 A1 Sep. 17, 2020

Related U.S. Application Data

(60) Provisional application No. 62/817,084, filed on Mar. 12, 2019.

(51) Int. Cl.
*H04N 19/52* (2014.01)
*H04N 19/159* (2014.01)
(Continued)

(52) U.S. Cl.
CPC ......... *H04N 19/117* (2014.11); *H04N 19/124* (2014.11); *H04N 19/159* (2014.11); *H04N 19/176* (2014.11); *H04N 19/52* (2014.11)

(58) Field of Classification Search
CPC .... H04N 19/11; H04N 19/105; H04N 19/159; H04N 19/59
See application file for complete search history.

(56) References Cited

U.S. PATENT DOCUMENTS 10,491,893 B1\* 11/2019 Zhao .................... H04N 19/593
10,841,578 B2\* 11/2020 Zhao .................... H04N 19/189
(Continued)

FOREIGN PATENT DOCUMENTS

| CN | 101827270 A | 9/2010 |
| CN | 102984523 A | 3/2013 |
| WO | 2018127624 A1 | 7/2018 |

OTHER PUBLICATIONS

Wide-angle intra prediction for non-square blocks; Zhao—2018. (Year: 2018).\*

(Continued)

*Primary Examiner* — Luis Perez-Fuentes
(74) *Attorney, Agent, or Firm* — ScienBiziP, P.C.

(57) ABSTRACT

A method of decoding a bitstream by an electronic device is provided. An image frame is received from the bitstream. A block unit is determined from the image frame. An intra prediction mode index corresponding to one of a plurality of wide-angle candidate modes each having an angle parameter is determined for the block unit based on the bitstream. A plurality of reference samples neighboring the block unit is determined. The electronic device determines whether the intra prediction mode index is different from predefined indices each corresponding to one of predefined wide-angle modes in the wide-angle candidate modes. A plurality of filtered samples is generated by an interpolation filter based on the reference samples when the intra prediction mode index is different from the predefined indices. The block unit is reconstructed based on the filtered samples along a mode direction of the intra prediction mode index.

20 Claims, 9 Drawing Sheets

(51) Int. Cl.
*H04N 19/117* (2014.01)
*H04N 19/124* (2014.01)
*H04N 19/176* (2014.01)

(56) References Cited

U.S. PATENT DOCUMENTS 11,128,872 B2 * 9/2021 Van der Auwera .... H04N 19/52
2018/0220158 A1 8/2018 Koo et al.

OTHER PUBLICATIONS

Extension of Simplified PDPC to Diagonal Intra Modes; Auwera—2018. (Year: 2018).*
Harmonization of Linear Interpolation (LIP) with (PDPC) and (WAIP); Heo—2018. (Year: 2018).*
An intra sub-partition coding mode for VVC; Hernandez—2019 (Year: 2019).*
ITU-T H265, High efficiency video coding; (2015). (Year: 2015).*
ITU-T H266, Versatile video coding; (2020). (Year: 2020).*
Library USPTO query for NPL.pdf; 2022. (Year: 2022).*

* cited by examiner

DEVICE AND METHOD FOR CODING VIDEO DATA

CROSS-REFERENCE TO RELATED APPLICATION(S)

The present disclosure claims the benefit of and priority to U.S. Provisional Patent Application Ser. No. 62/817,084, filed on Mar. 12, 2019, entitled "MPM Derivation Method for Intra Prediction and Context Table Selection Method for AMVR (the "US76694 application"). The disclosure of the US76694 application is hereby incorporated fully by reference into the present disclosure.

FIELD

The present disclosure generally relates to video coding, and more particularly, to techniques for selecting one of a plurality of sample filters to predict a block unit in an image frame.

BACKGROUND

Intra prediction is a coding tool in a video coding method. In a conventional video coding method, an encoder and a decoder use previously reconstructed pixels in a closest pixel line adjacent to a coding block to generate reference pixels and predictors for predicting or reconstructing the coding block along an orientation when a prediction mode of the coding block is an intra angular mode. Before the predictors of the coding block are generated from the reference pixels based on the orientation, the reference pixels are filtered by an interpolation filter. However, a number of computations in the interpolation filter for the coding block is equal to a product W×H of a block width W and a block height H of the coding block such that the filter process may be too complex for the video coding method. Therefore, the encoder and the decoder need to decrease a usage rate of the interpolation filter to increase coding efficiency.

SUMMARY

The present disclosure is directed to a device and method for filtering a plurality of reference samples of a block unit in an image frame by one of a plurality of sample filters selected based on an intra prediction mode index.

In a first aspect of the present disclosure, a method for decoding a bitstream by an electronic device is provided. The method comprises receiving an image frame of the bitstream and determining a block unit from the received image frame; determining an intra prediction mode index of the block unit based on the bitstream, the intra prediction mode index corresponding to one of a plurality of wide-angle candidate modes each having an angle parameter; determining a plurality of reference samples neighboring the block unit; determining whether the determined intra prediction mode index is equal to at least one of a plurality of predefined indices each corresponding to one of a plurality of predefined wide-angle modes in the plurality of wide-angle candidate modes; generating a plurality of filtered samples by an interpolation filter based on the determined plurality of reference samples when the determined intra prediction mode index is not equal to at least one of the plurality of predefined indices; and reconstructing the determined block unit based on the generated plurality of filtered samples along a mode direction of the determined intra prediction mode index. In the method, the angle parameters of the plurality of predefined wide-angle modes are divisible by a predefined value.

In a second aspect of the present disclosure, a method for decoding a bitstream by an electronic device is provided. The method comprises receiving an image frame of the bitstream and determining a block unit from the received image frame; determining an intra prediction mode index of the determined block unit based on the bitstream; determining a plurality of reference samples neighboring the determined block unit; comparing the determined intra prediction mode index with a plurality of predefined indices each corresponding to an angle parameter divisible by a predefined value; generating a plurality of filtered samples by one of a plurality of sample filters selected based on the comparison, the plurality of filtered samples determined based on the determined plurality of reference samples; and reconstructing the determined block unit based on the generated plurality of filtered samples and the determined intra prediction mode index.

BRIEF DESCRIPTION OF THE DRAWINGS

Aspects of the disclosure are best understood from the following detailed description when read with the accompanying figures. Various features are not drawn to scale and dimensions of various features may be arbitrarily increased or reduced for clarity of discussion.

DETAILED DESCRIPTION

Figure 1:
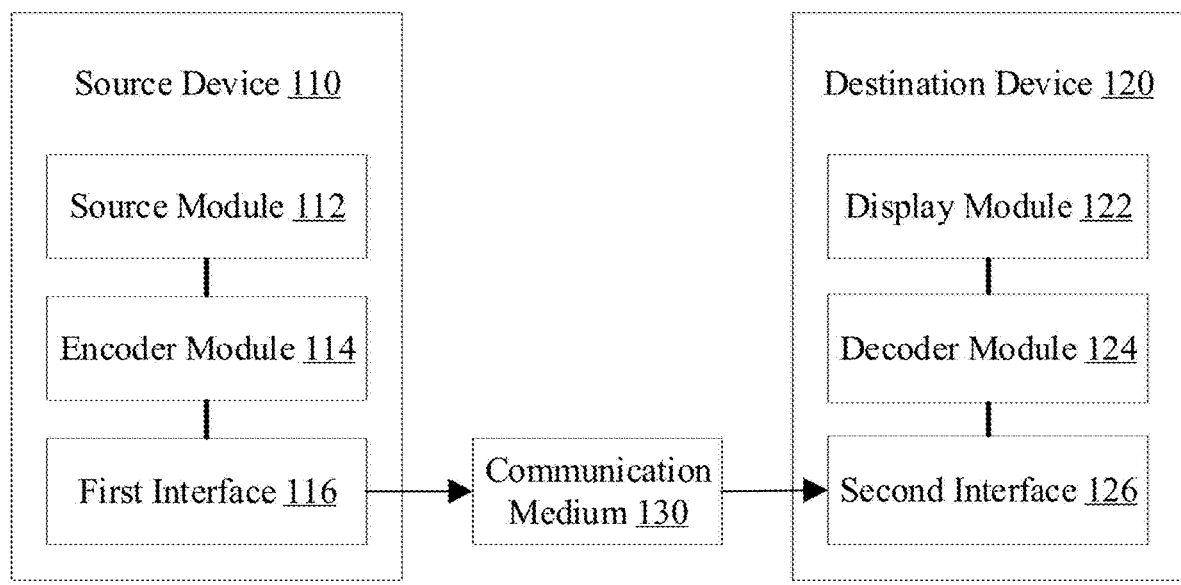
FIG. 1 illustrates a block diagram of an example system configured to encode and decode video data according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations.

Other variations and implementations of the present disclosure will occur to those skilled in the art.

Unless noted otherwise, like or corresponding elements among the figures may be indicated by like or corresponding reference numerals. The drawings and illustrations in the present disclosure are generally not to scale and are not intended to correspond to actual relative dimensions.

For the purpose of consistency and ease of understanding, like features are identified (although, in some examples, not shown) by numerals in the exemplary figures. However, the features in different implementations may differ in other respects and shall not be narrowly confined to what is shown in the figures.

The description uses the phrases "in one implementation," or "in some implementations," may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details such as functional entities, techniques, protocols, and standards are set forth for providing an understanding of the disclosed technology. In other examples, detailed description of well-known methods, technologies, systems and architectures are omitted so as not to obscure the description with unnecessary details.

Persons skilled in the art will immediately recognize that any disclosed coding function(s) or algorithm(s) described in the present disclosure may be implemented by hardware, software or a combination of software and hardware. Described functions may correspond to modules may be software, hardware, firmware, or any combination thereof.

A software implementation may include computer executable instructions stored on computer readable medium such as memory or other type of storage devices. For example, one or more microprocessors or general-purpose computers with communication processing capability may be programmed with executable instructions and performs the disclosed function(s) or algorithm(s).

The microprocessors or general-purpose computers may be formed of applications specific integrated circuitry (ASIC), programmable logic arrays, and/or using one or more digital signal processors (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an example implementation of the present disclosure. The system 100 includes a source device 110, a destination device 120, and a communication medium 130. The source device 110 may include any device configured to encode video data and transmit encoded video data to the communication medium 130. The destination device 120 may include any device configured to receive encoded video data via the communication medium 130 and to decode encoded video data.

In at least one implementation, the source device 110 may wiredly and/or wirelessly communicate with the destination device 120 via the communication medium 130. The source device 110 may include a source module 112, an encoder module 114, and a first interface 116. The destination device 120 may include a display module 122, a decoder module 124, and a second interface 126. The source device 110 may be a video encoder and the destination device 120 may be a video decoder.

In at least one implementation, the source device 110 and/or the destination device 120 may be a mobile phone, a tablet, a desktop, a notebook, or other electronic devices. FIG. 1 merely illustrates one example of the source device 110 and the destination device 120. The source device 110 and destination device 120 in other implementations may include more or less components than illustrated or have a different configuration of the various components.

In at least one implementation, the source module 112 may include a video capture device to capture a new video, a video archive storing previously captured video, and/or a video feed interface to receive video from a video content provider. The source module 112 may generate computer graphics-based data as the source video or generate a combination of live video, archived video, and computer-generated video. The video capture device may be a charge-coupled device (CCD) image sensor, a complementary metal-oxide-semiconductor (CMOS) image sensor, or a camera.

In at least one implementation, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When implemented partially in software, a device may store instructions for the software in a suitable, non-transitory computer-readable medium and execute the instructions in hardware using one or more processors to perform the disclosed methods. In at least one implementation, each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 116 and the second interface 126 may each include any device configured to transmit and/or store a compliant video bitstream in the communication medium 130 and to receive the compliant video bitstream from the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra-high definition display.

Figure 2:
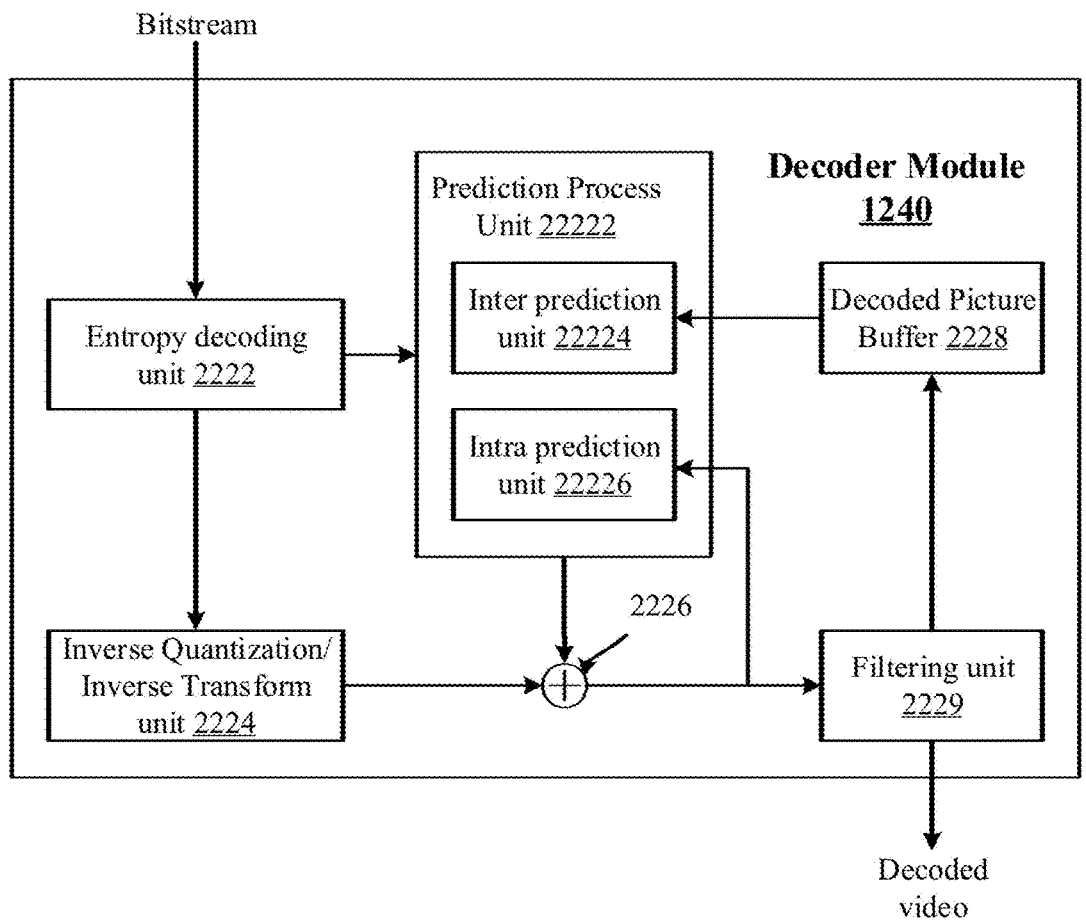
FIG. 2 illustrates a block diagram of an example decoder module of the destination device in FIG. 1 according to an example implementation of the present application.

FIG. 2 illustrates a block diagram of a decoder module 1240 representing an implementation of the decoder module 124 of the destination device 120 in FIG. 1, according to an example implementation of the present application. The decoder module 1240 includes an entropy decoder (e.g., an entropy decoding unit 2222), a prediction processor (e.g., a prediction process unit 22222), an inverse quantization/inverse transform processor (e.g., an inverse quantization/inverse transform unit 2224), a summer (e.g., a first summer 2226), a filter (e.g., a filtering unit 2229), and a decoded picture buffer (e.g., a decoded picture buffer 2228). The prediction process unit 22222 further includes an intra prediction processor (intra prediction unit 22226) and an inter prediction processor (inter prediction unit 22224). The decoder module 1240 receives a bitstream and decodes the bitstream to output decoded video.

The entropy decoding unit 2222 may receive the bitstream including a plurality of syntax elements from the second interface 126 in FIG. 1 and perform a parsing operation on the bitstream to extract syntax elements from the bitstream. As part of the parsing operation, the entropy decoding unit 2222 may entropy decode the bitstream to generate quantized transform coefficients, quantization parameters, transform data, motion vectors, intra modes, partition information, and other syntax information.

In at least one implementation, the entropy decoding unit 2222 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2222 may provide the quantized transform coefficients, the quantization parameters, and the transform data to the inverse quantization/inverse transform unit 2224 and provide the motion vectors, the intra modes, the partition information, and other syntax information to the prediction process unit 22222.

In at least one implementation, the prediction process unit 22222 may receive syntax elements such as motion vectors, intra modes, partition information, and other syntax information from the entropy decoding unit 2222. The prediction process unit 22222 may receive the syntax elements including the partition information and divide image frames according to the partition information.

In at least one implementation, each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 22222 receives predicted data including the intra mode or the motion vector for a current image block of a specific one of the image frames. The current image block may be one of the luminance block and at least one of the chrominance blocks in the specific image frame.

In at least one implementation, the intra prediction unit 22226 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In at least one implementation, the intra prediction unit 22226 may reconstruct a plurality of chroma components of the current block unit based on a plurality of luma components of the current block unit when the luma components are reconstructed by the prediction process unit 22222.

In at least one implementation, the intra prediction unit 22221 may reconstruct a plurality of chroma components of the current block unit based on the plurality of luma components of the current block unit when the luma components of the current block are reconstructed by the prediction process unit 2222.

In at least one implementation, the inter prediction unit 22224 may perform inter-predictive coding of the current block unit relative to one or more blocks in one or more reference image blocks based on syntax elements related to the motion vector in order to generate the predicted block. In at least one implementation, the motion vector may indicate a displacement of the current block unit within the current image block relative to a reference block unit within the reference image block. The reference block unit is a block determined to closely match the current block unit. In at least one implementation, the inter prediction unit 22224 receives the reference image block stored in the decoded picture buffer 2228 and reconstructs the current block unit based on the received reference image blocks.

In at least one implementation, the inverse quantization/inverse transform unit 2224 may apply inverse quantization and inverse transformation to reconstruct the residual block in the pixel domain. The inverse quantization/inverse transform unit 2224 may apply inverse quantization to the residual quantized transform coefficient to generate a residual transform coefficient and then apply inverse transformation to the residual transform coefficient to generate the residual block in the pixel domain. In at least one implementation, the inverse transformation may be inversely applied by the transformation process such as discrete cosine transform (DCT), discrete sine transform (DST), adaptive multiple transform (AMT), mode-dependent non-separable secondary transform (MDNSST), hyper-cube-givens transform (HyGT), signal dependent transform, Karhunen-Loéve transform (KLT), wavelet transform, integer transform, sub-band transform or a conceptually similar transform.

In at least one implementation, the inverse transformation may convert the residual information from a transform domain, such as a frequency domain, back to the pixel domain. In at least one implementation, the degree of inverse quantization may be modified by adjusting a quantization parameter. The first summer 2226 adds the residual block to the predicted block from the prediction process unit 22222 to produce a reconstructed block.

In at least one implementation, the first summer 2224 adds the reconstructed residual block to the predicted block provided from the prediction process unit 2222 to produce a reconstructed block.

In at least one implementation, the filtering unit 2229 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF.

Such filters are not shown for brevity but may filter the output of the first summer 2226. The filtering unit 2229 may output the decoded video to the display module 122 or other video receiving unit after the filtering unit 2229 performs the filtering process for the reconstructed blocks of the specific image frame.

In at least one implementation, the decoded picture buffer 2228 may be a reference picture memory that stores the reference block for use by the prediction process unit 22222 in decoding the bitstream (in inter coding modes). The decoded picture buffer 2228 may be formed by any of a variety of memory devices such as dynamic random access memory (DRAM), including synchronous DRAM (SDRAM), magneto-resistive RAM (MRAM), resistive RAM (RRAM), or other types of memory devices. In at least one implementation, the decoded picture buffer 2228 may be on-chip with other components of the decoder module 1240 or off-chip relative to those components.

Figure 3:
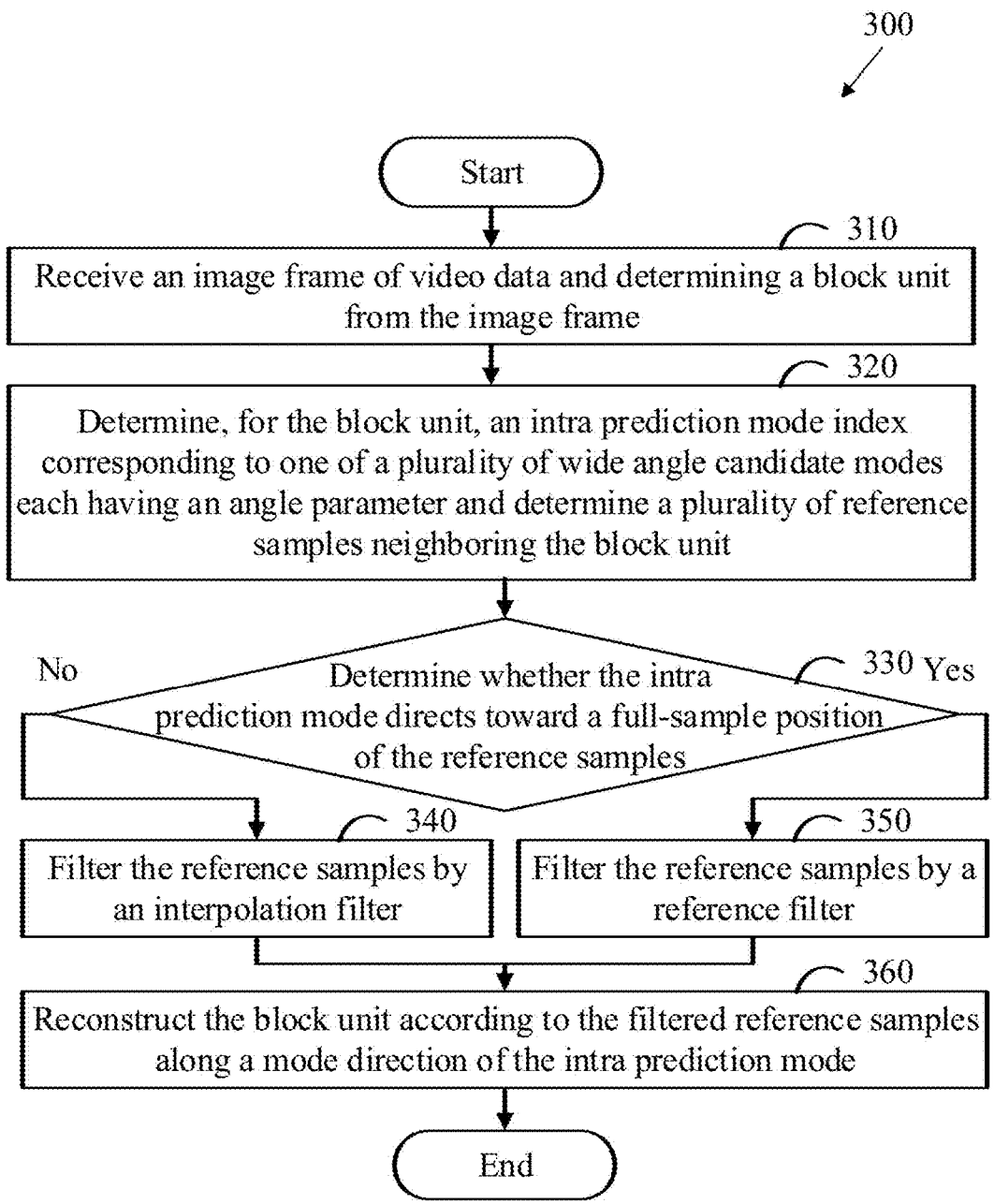
FIG. 3 illustrates a flowchart of an example reconstruction method for reconstructing a block unit according to an example implementation of the present disclosure.

FIG. 3 illustrates a flowchart of an example reconstruction method 300 for reconstructing a block unit by selecting a sample filter based on an intra prediction mode of the block unit according to an example implementation of the present disclosure. The method 300 is an example only as there are a variety of ways to perform the method.

The method 300 may be performed using the configurations illustrated in FIG. 1 and FIG. 2 and various elements of these figures are referenced in explaining the method 300. Each block shown in FIG. 3 may represent one or more processes, methods, or subroutines performed.

Furthermore, the order of blocks is illustrative only and may change. Additional blocks may be added or less blocks may be utilized without departing from the present disclosure.

At block 310, the decoder module 1240 receives an image frame of video data and determines a block unit from the image frame according to the video data. The video data may be a bitstream.

With reference to FIG. 1 and FIG. 2, the destination device 120 may receive the bitstream from an encoder, such as the source device 110, via the second interface 126. The second interface 126 may provide the bitstream to the decoder module 1240.

The decoder module 1240 may determine the image frame based on the bitstream and divide the image frame to determine the block unit according to a plurality of partition indications in the bitstream. For example, the decoder module 1240 may divide the image frames to generate a plurality of coding tree units and may further divide one of the coding tree units to determine the block unit according to the partition indications (e.g., based on a video coding standard).

In at least one implementation, the entropy decoding unit 2222 may decode the bitstream to determine a plurality of prediction indications for the block unit and the decoder module 1240 may further reconstruct the block unit based on the prediction indications. The prediction indications may include a plurality of flags and a plurality of indices.

At block 320, the decoder module 1240 determines an intra prediction mode index corresponding to one of a plurality of wide-angle candidate modes for the block unit based on the video data and determines a plurality of reference samples neighboring the block unit. Each of the plurality of wide-angle candidate modes has an angle parameter.

In at least one implementation, with reference to FIG. 2, the decoder module 1240 may select an intra prediction mode from a plurality of intra candidate modes on an intra mode list based on the intra prediction mode index when the block unit is predicted in an intra prediction.

In at least one implementation, the intra prediction mode index may be included in the prediction indications for the block unit. The intra prediction mode index may be derived based on a block prediction index included in the prediction indications for the block unit.

In at least one implementation, each of the intra candidate modes has intra mode indices that each indicate a corresponding one of the intra candidate modes. The intra candidate modes include the wide-angle candidate modes and the intra mode indices of the wide-angle candidate modes may be a plurality of wide-angle mode indices. The intra prediction mode index may be equal to one of the wide-angle mode indices when the intra prediction mode index is derived based on the block prediction index different from the intra prediction mode index.

The intra candidate modes may include a plurality of non-angular candidate modes and a plurality of angular candidate modes. The non-angular candidate modes may be a planar mode and a DC mode. The intra mode index of the planar mode may be zero and the intra mode index of the DC mode may be equal to one.

In at least one implementation, each of the wide-angle candidate modes may be included in the angular candidate modes. Others of the angular candidate modes different from the wide-angle candidate modes may be a plurality of angular default candidate modes. The intra mode indices of the angular candidate modes may include −14−−1 and 2-80 when the decoder module 1240 decodes the bitstream based on a video coding standard, such as versatile video coding (VVC).

Figure 4:
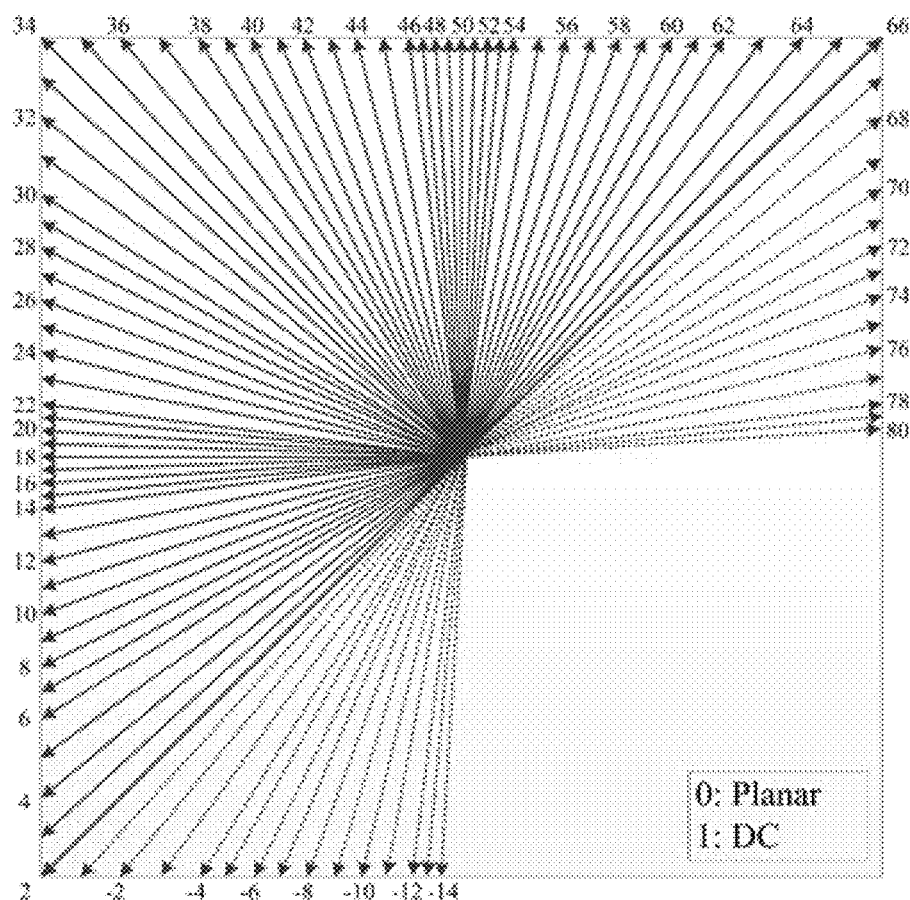
FIG. 4 illustrates a plurality of intra candidate modes according to example implementations of the present disclosure.

FIG. 4 is a schematic illustration of a plurality of intra candidate modes according to implementations of the present disclosure. The intra mode indices of the angular default candidate modes may include 2-66 and the wide-angle mode indices of the wide-angle candidate modes may include −14−−1 and 67-80.

In at least one implementation, each of the angular candidate modes has an angle parameter IntraPredAngle. The angle parameters of the intra candidate modes may be predefined for encoding the video data and decoding the video data. Table 1 shows an implementation in which indices are assigned to the angular candidate modes each having an angle parameter. Each of the angular candidate modes may correspond to one of the angular default candidate modes 2-66 and the wide-angle candidate modes −14−−1 and 67-80 in Table 1.

TABLE 1

| Intra mode index | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| IntraPredAngle | 512 | 341 | 256 | 171 | 128 | 102 | 86 | 73 | 64 | 57 | 51 | 45 | 39 | 35 | 32 | 29 | 26 |
| Intra mode index | 5 | 6 | 7 | 8 | 9 | 10 | 11 | 12 | 13 | 14 | 15 | 16 | 17 | 18 | 19 | 20 | 21 |
| IntraPredAngle | 23 | 20 | 18 | 16 | 14 | 12 | 10 | 8 | 6 | 4 | 3 | 2 | 1 | 0 | −1 | −2 | −3 |
| Intra mode index | 22 | 23 | 24 | 25 | 26 | 27 | 28 | 29 | 30 | 31 | 32 | 33 | 34 | 35 | 36 | 37 | 38 |
| IntraPredAngle | −4 | −6 | −8 | −10 | −12 | −14 | −16 | −18 | −20 | −23 | −26 | −29 | −32 | −29 | −26 | −23 | −20 |
| Intra mode index | 39 | 40 | 41 | 42 | 43 | 44 | 45 | 46 | 47 | 48 | 49 | 50 | 51 | 52 | 53 | 54 | 55 |
| IntraPredAngle | −18 | −16 | −14 | −12 | −10 | −8 | −6 | −4 | −3 | −2 | −1 | 0 | 1 | 2 | 3 | 4 | 6 |
| Intra mode index | 56 | 57 | 58 | 59 | 60 | 61 | 62 | 63 | 64 | 65 | 66 | 67 | 68 | 69 | 70 | 71 | 72 |
| IntraPredAngle | 8 | 10 | 12 | 14 | 16 | 18 | 20 | 23 | 26 | 29 | 32 | 35 | 39 | 45 | 51 | 57 | 64 |
| Intra mode index | 73 | 74 | 75 | 76 | 77 | 78 | 79 | 80 | | | | | | | | | |
| IntraPredAngle | 73 | 86 | 102 | 128 | 171 | 256 | 341 | 512 | | | | | | | | | |

In at least one implementation, with reference to FIG. 2, the decoder module 1240 may determine a plurality of neighboring blocks neighboring the block unit. In at least one implementation, some of the neighboring blocks may be reconstructed prior to reconstructing the block unit such that each of the reconstructed neighboring blocks may include a plurality of reference blocks of the block unit for reconstructing the block unit.

In at least one implementation, the block unit may be reconstructed prior to reconstructing some of the neighboring blocks such the unreconstructed neighboring blocks may not include the reference blocks of the block unit for reconstructing the block unit. Each of the reference blocks included in the reconstructed neighboring blocks may include a reference component. The reference components included in the reference blocks may be selected as the reference samples for reconstructing the block unit.

Figure 5:
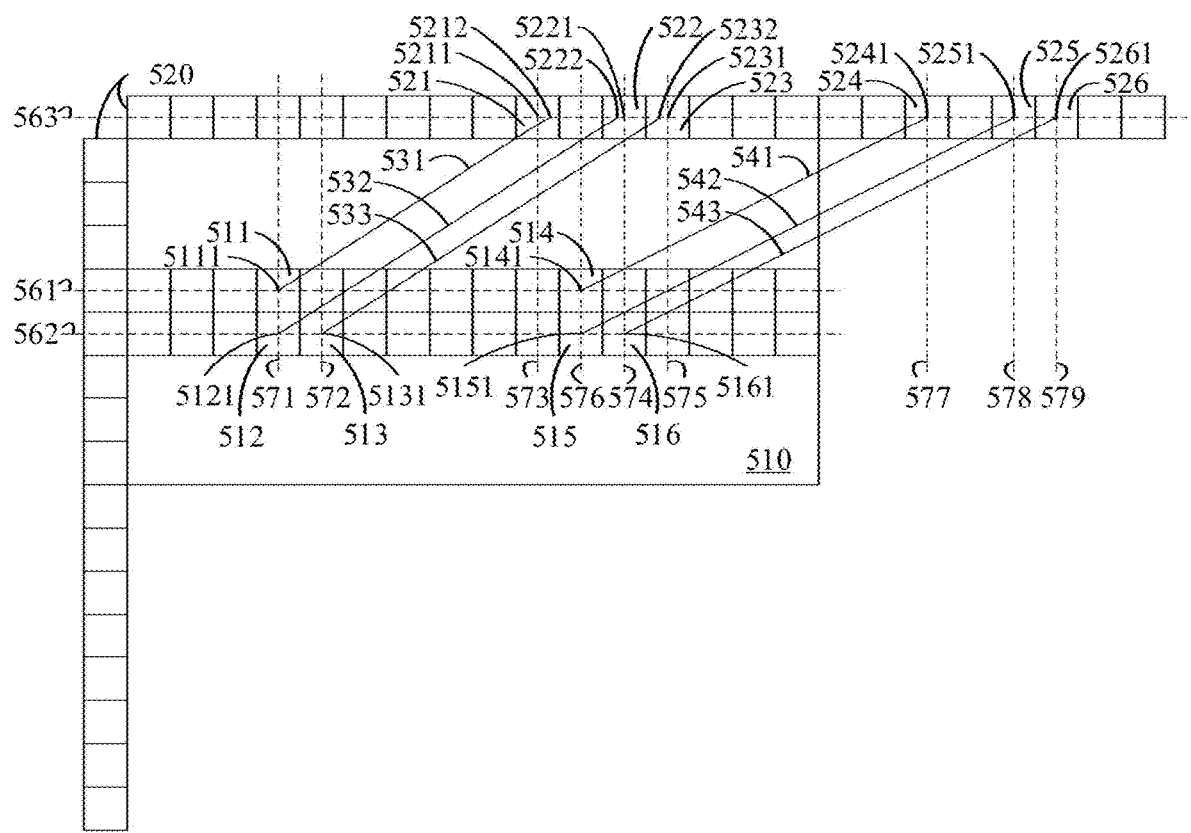
FIG. 5 illustrates a plurality of component blocks in a block unit, a plurality of reference blocks and a plurality of wide-angle candidate modes according to example implementations of the present disclosure.

FIG. 5 illustrates a plurality of component blocks in a block unit, a plurality of reference blocks and a plurality of wide-angle candidate modes according to the present disclosure. The block unit 510 may include the component blocks (component blocks 511-516) and the reconstructed neighboring blocks (not shown) may include a reference block 520 including reference blocks 521-526.

FIG. 5 illustrates one example of the reference blocks 521-526. Other implementations may include more or less reference blocks than illustrated or have a different configuration of the various reference blocks. A plurality of fictitious horizontal lines 561-563 and a plurality of fictitious vertical lines 571-579 are shown in FIG. 5 only for illustrating the full-sample positions since it is unnecessary for the decoder module 1240 to determine the fictitious horizontal lines 561-563 and the fictitious vertical lines 571-579 for the block unit 510.

In at least one implementation, each of the reference blocks 520 may include a reference component and the reference components in the reference blocks 520 may be selected as the reference samples. The reference components of the reference blocks 520 may be determined by reconstructing the neighboring blocks to represent a pixel component in the neighboring blocks. For example, each of the reference blocks 520 may include only one reference luminance component when the decoder module 1240 reconstructs a plurality of luminance components in the block unit 510.

The reference samples selected from the reference components may be located at a plurality of block centers of the reference blocks. The block centers may be a plurality of full-sample positions, such as full-sample positions 5211-5261 determined based on a plurality of full-sample intersections between the fictitious horizontal line (fictitious horizontal line 563) and the fictitious vertical lines (fictitious vertical lines 573-575 and 577-579). The other positions in the reference blocks may be determined as a plurality of fractional-sample positions (fractional-sample positions 5212-5232) based on a plurality of fraction sample intersections between a mode direction (531-533 and 541-543) of the intra prediction mode and the fictitious horizontal line 563. Each of the fractional-sample positions may be located between two adjacent reference samples such as fractional-sample position 5232 located between two adjacent reference samples at the two full-sample positions 5221 and 5231.

At block 330, the decoder module 1240 may determine whether the intra prediction mode is directed toward a full-sample position of the reference samples. In at least one implementation, the method 300 may proceed to block 340 when the intra prediction mode is directed toward a fractional-sample position neighboring the reference samples. The method may proceed to block 350 when the intra prediction mode is directed toward the full-sample position of the reference samples.

In at least one implementation, with reference to FIG. 2 and FIG. 5, the decoder module 1240 may determine whether the intra prediction mode is directed toward the full-sample position of the reference samples in the reference blocks 520 when the intra prediction mode is one of the angular candidate modes. Each of the component blocks 511-516 may be determined for predicting a pixel component in the block unit. For example, each of the component blocks 511-516 may include only one luminance component when the decoder module 1240 predicts the luma components in the block unit.

The predicted components may be located at a plurality of block centers of the component blocks. The block centers may be a plurality of full-sample positions, such as the full-sample positions 5111-5161 determined based on a plurality of full-sample intersections between the fictitious horizontal lines 561-562 and the fictitious vertical lines 571-572, 574 and 576.

In at least one implementation, the intra prediction mode may be a specific one of the wide-angle candidate modes determined based on the intra prediction mode index. For example, the specific wide-angle candidate mode may indicate a first wide-angle direction including a plurality of first component directions 531-533 directed from the full-sample positions 5111-5131 of the component blocks 511-513 towards the reference blocks 520.

A plurality of first sample intersections between the fictitious horizontal line 563 and the first component directions 531-533 are the fractional-sample positions 5212-5232 of the reference blocks 521-523 different from the full-sample positions 5211-5231 of the reference blocks 521-523. Therefore, the decoder module 1240 may determine that the intra prediction mode is directed toward the fractional-sample position of the reference blocks when the specific wide-angle candidate mode indicates the first wide-angle direction. The specific wide-angle candidate mode may indicate a second wide-angle direction including a plurality of second component directions 541-543 directed from the full-sample positions 5141-5161 of the component blocks 514-516 towards the reference blocks 520.

A plurality of second sample intersections between the fictitious horizontal line 563 and the second component directions 541-543 are the full-sample positions 5241-5261 of the reference blocks 524-526. The decoder module 1240 may determine that the intra prediction mode is directed toward the full-sample position of the reference samples in the reference blocks when the specific wide-angle candidate mode indicates the second wide-angle direction.

In at least one implementation, referring to FIG. 1, the intra candidate modes may be predefined in the source device 110 and the destination device 120. Therefore, the angular candidate modes directed toward the full-sample position of the reference samples may be predetermined in the source device 110 and the destination device 120.

The angular candidate modes directed toward the full-sample position of the reference samples may be predetermined as a plurality of predefined angular modes. The wide-angle candidate modes directed toward the full-sample position of the reference samples may be predetermined as a plurality of predefined wide-angle modes. The wide-angle mode indices of the predefined wide-angle modes may be predetermined as a plurality of predefined indices.

In at least one implementation, the decoder module 1240 may directly compare the intra prediction mode index with the predefined indices to determine whether the intra prediction mode is directed toward the full-sample position of the reference samples. The decoder module 1240 may directly determine that the intra prediction mode is directed toward the full-sample position of the reference samples when the intra prediction mode index is equal to one of the predefined indices. The decoder module 1240 may directly determine that the intra prediction mode is directed toward the fractional-sample position of the reference blocks when the intra prediction mode index is different from the predefined indices.

In at least one implementation, the angle parameters of the predefined indices may be divisible by a predefined value. The predefined value may be equal to a fractional sample precision parameter of an interpolation filter. The reference samples of the component blocks may not be located at the fractional-sample position when the angle parameter of the intra prediction mode index is divisible by the fractional sample precision parameter of the interpolation filter.

The fractional sample precision parameter of the interpolation filter in VVC may be predefined at block 320 in FIG. 3 such the predefined value is 32. Therefore, the predefined indices may include −14, −12, −10, −6, 2, 34, 66, 72, 76, 78, and 80 according to Table 1.

At block 340, the decoder module may filter the reference samples by an interpolation filter.

In at least one implementation, referring to FIG. 2 and FIG. 5, the decoder module 1240 may filter the reference samples in block 340 of FIG. 3 using the interpolation filter to generate a plurality of filtered reference samples. There may be no reference sample located at a plurality of sample intersections between the fictitious horizontal line 563 and the component directions of the intra prediction mode when the intra prediction mode is directed from the block unit 510 toward the fractional-sample position of the reference blocks. Therefore, the decoder module 1240 may select some of the reference samples neighboring the sample intersections and generate the filtered reference samples by interpolation based on the selected reference samples.

The component direction 533 may be directed from the component block 513 toward the fractional-sample position 5232 of the reference block 523. Therefore, the decoder module 1240 may select the reference samples in the reference blocks 522, 523 and/or other adjacent reference blocks to generate the filtered reference sample by interpolation based on the selected reference samples for the component block 513. The interpolation filter may include at least one of four-taps Gaussian filters (fG) and four-taps DCT-filters (fC).

At block 350, the decoder module may filter the reference samples by a reference filter.

In at least one implementation, referring to FIG. 2 and FIG. 5, the decoder module 1240 may filter the reference samples in block 350 of FIG. 3 using the reference filter to generate the filtered reference samples. The filtered samples bypass the interpolation filter when the reference samples are filtered by the reference filter to generate the filtered samples. The plurality of sample intersections between the fictitious horizontal line 563 and the component directions of the intra prediction mode may be located at the full-sample positions when the intra prediction mode is directed from the block unit 510 toward the full-sample position of the reference samples. Therefore, the decoder module 1240 may directly select the reference samples without interpolation to generate the filtered reference samples.

The component direction 542 may be directed from the component block 515 toward the full-sample position 5251 of the reference block 525. Therefore, the decoder module 1240 may select the reference sample in reference block 525 for the component block 515.

The selected reference block may be filtered by the reference filter. In the implementation, the reference filter may be a [1 2 1] three-taps smoothing filter applicable to the reference samples in the selected reference block and other reference blocks neighboring the selected reference block. The filtered reference samples $p[x][y]$ with $x=-1$, $y=-1..refH-1$ and $x=0..refW-1$, $y=-1$ may be derived by the reference filter based on the unfiltered reference samples $refUnfilt[x][y]$ as follows:

refH is a reference sample height and refW is a reference sample width.

$$p[-1][-1]=refUnfilt[-1][0]+2*refUnfilt[-1][-1]+refUnfilt[0][-1]+2)>>2$$

$$p[-1][refH-1]=refUnfilt[-1][refH-1]$$

$$p[refW-1][-1]=refUnfilt[refW-1][-1]$$

$$p[-1][y]=(refUnfilt[-1][y+1]+2*refUnfilt[-1][y]+refUnfilt[-1][y-1]+2)>>2$$

for $y=0..refH-2$ $$p[x][-1]=(refUnfilt[x-1][-1]+2*refUnfilt[x][-1]+refUnfilt[x+1][-1]+2)>>2$$

for $x=0..refW-2$

At block 360, the decoder module 1240 may reconstruct the block unit according to the filtered reference samples along the mode direction of the intra prediction mode. Referring to FIG. 1 and FIG. 2, the inter prediction unit 22224 may generate a predicted component for one of the component blocks in the block unit according to the filtered reference samples along the mode direction of the intra prediction mode.

In at least one implementation, the first summer 2226 in the destination device 120 may add the predicted components to a plurality of residual components determined from the bitstream to reconstruct the block unit. The decoder module 1240 may reconstruct all other block units in the image frame for reconstructing the image frame and the video.

Figure 6:
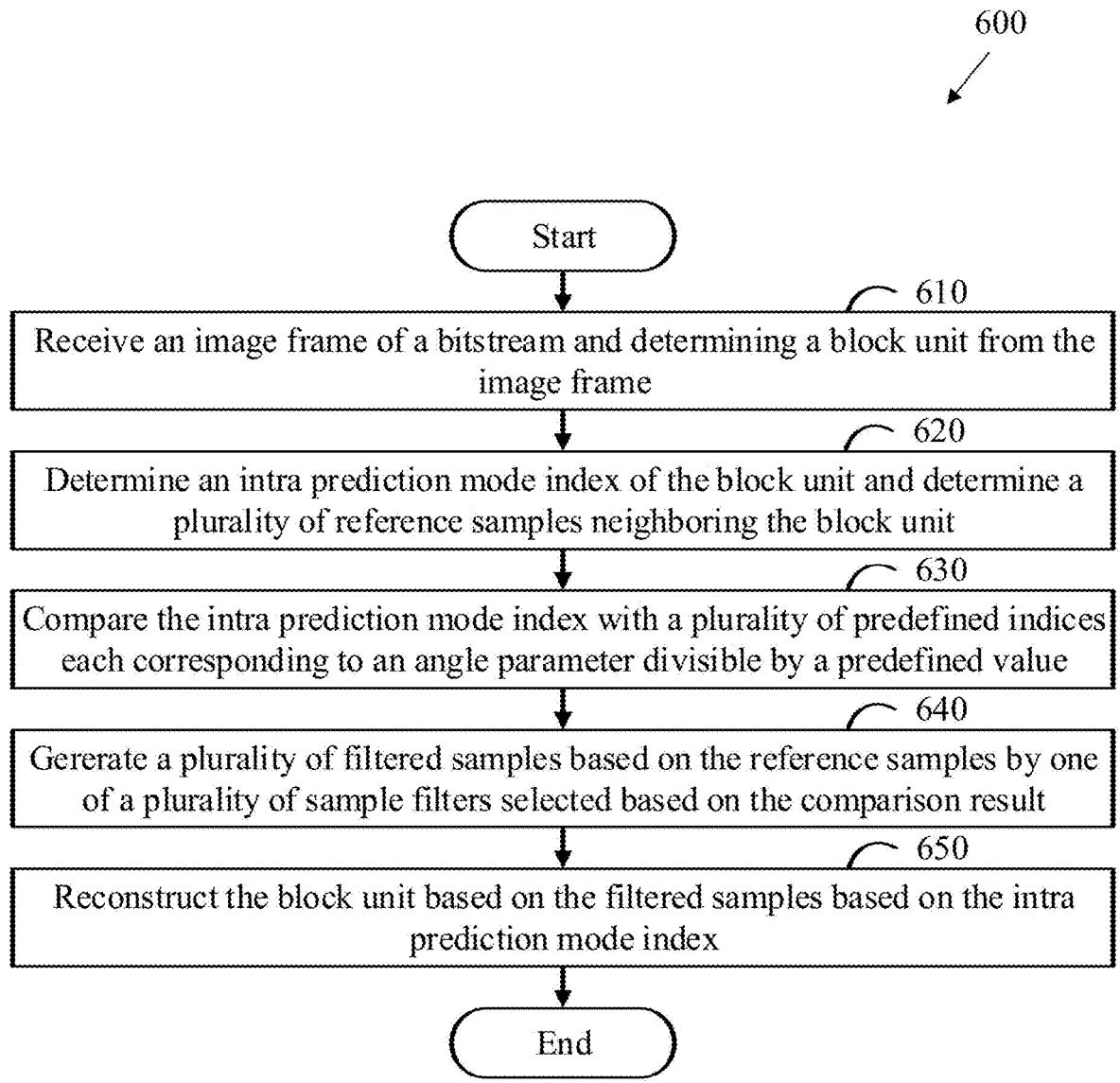
FIG. 6 illustrates a flowchart of another example reconstruction method for reconstructing a block unit according to an example implementation of the present disclosure.

FIG. 6 illustrates a flowchart of another method 600 for reconstructing a block unit by selecting a sample filter based on an intra prediction mode index of the block unit according to the present disclosure. The method 600 is provided as an example only and there are a variety of ways to perform the method.

The method 600 may be performed using the configurations illustrated in FIG. 1 and FIG. 2 and the various elements are referenced in describing the method 600. Each block shown in the method 600 may represent one or more processes, methods, or subroutines, performed. The order of blocks is illustrative only and may change. Additional blocks may be added or fewer blocks may be utilized without departing from the present disclosure.

At block 610, the decoder module 1240 may receive an image frame of video data and determine a block unit from the image frame. The video data may be a bitstream.

With reference to FIG. 1 and FIG. 2, the destination device 120 may receive the bitstream from an encoder, such as the source device 110, via the second interface 126. The second interface 126 may provide the bitstream to the decoder module 1240.

The decoder module 1240 may determine the image frame based on the bitstream and divide the image frame to determine the block unit according to a plurality of partition indications in the bitstream. The decoder module 1240 may divide the image frames to generate a plurality of coding tree units and further divide one of the coding tree units to determine the block unit according to the partition indications (based on a video coding standard).

In at least one implementation, the entropy decoding unit 2222 may decode the bitstream to determine a plurality of prediction indications for the block unit and the decoder module 1240 may further reconstruct the block unit based on the prediction indications. The prediction indications may include a plurality of flags and a plurality of indices.

At block 620, the decoder module 1240 may determine an intra prediction mode index of the block unit based on the bitstream and determine a plurality of reference samples neighboring the block unit. Referring to FIG. 2, the decoder module 1240 may select an intra prediction mode from a plurality of intra candidate modes of an intra mode list based on the intra prediction mode index when the block unit is predicted in an intra prediction.

In at least one implementation, the intra prediction mode index may be included in the prediction indications for the block unit. The intra prediction mode index may be derived based on a block prediction index included in the prediction indications for the block unit.

In at least one implementation, each of the intra candidate modes has intra mode indices that each indicate a corresponding one of the intra candidate modes. The intra candidate modes include the wide-angle candidate modes and the intra mode indices of the wide-angle candidate modes may be a plurality of wide-angle mode indices. The intra prediction mode index may be equal to one of the wide-angle mode indices when the intra prediction mode index is derived based on a block prediction index different from the intra prediction mode index.

In at least one implementation, the intra candidate modes may include a plurality of non-angular candidate modes and a plurality of angular candidate modes. The non-angular candidate modes may be a planar mode and a DC mode.

In the implementation, the intra mode index of the planar mode may be equal to zero and the intra mode index of the DC mode may be equal to one. Each of the wide-angle candidate modes may be included in the angular candidate modes and other angular candidate modes different from the wide-angle candidate modes may be a plurality of angular default candidate modes. The intra mode indices of the angular candidate modes may include −14−−1 and 2-80 in Table 1 when the decoder module 1240 decodes the bitstream based on a video coding standard such as VVC.

In at least one implementation, each of the angular candidate modes has an angle parameter IntraPredAngle. The angle parameters of the intra candidate modes may be predefined for encoding the video data and decoding the video data.

In at least one implementation, with reference to FIG. 2, the decoder module 1240 may determine a plurality of blocks neighboring the block unit. Each of the neighboring blocks reconstructed prior to reconstructing the block unit may include a plurality of reference blocks of the block unit for reconstructing the block unit.

In at least one implementation, each of the reference blocks included in the reconstructed neighboring blocks may include a reference component. The reference components included in the reference blocks may be selected as the reference samples for reconstructing the block unit.

In at least one implementation, referring to FIG. 5, the block unit 510 may include the component blocks 511-516 and the reconstructed neighboring blocks may include the reference blocks 520 having reference blocks 521-526. A plurality of fictitious horizontal lines 561-563 and a plurality of fictitious vertical lines 571-579 are shown in FIG. 5 only for illustrating the full-sample positions and it is unnecessary for the decoder module 1240 to determine the fictitious horizontal lines 561-563 and the fictitious vertical lines 571-579.

In at least one implementation, each of the reference blocks 520 may include a reference component and the reference components may be selected as the reference samples. The reference samples may be located at a plurality of block centers of the reference blocks. For example, each of the reference blocks 520 may include only one reference luminance component when the decoder module 1240 reconstructs a plurality of luminance components in the block unit 510.

In at least one implementation, the block centers may include a plurality of full-sample positions 5211-5261 determined based on a plurality of full-sample intersections between the fictitious horizontal line 563 and the fictitious vertical lines 573-575 and 577-579. Other positions in the reference blocks 521-526 may be determined as a plurality of fractional-sample positions (fractional-sample positions 5212-5232) based on a plurality of fraction sample intersections between a mode direction of the intra prediction mode and the fictitious horizontal line 563.

In at least one implementation, each of the fractional-sample positions may be located between two adjacent reference samples. For example, the fractional-sample position 5232 is located between two adjacent reference samples located at the two full-sample positions 5221 and 5231.

At block 630, the decoder module 1240 may compare the intra prediction mode index with a plurality of predefined indices each corresponding to an angle parameter divisible by predefined value. Referring to FIG. 1, the intra candidate modes and the intra mode indices may be predefined in the source device 110 and the destination device 120.

Some of the intra mode indices may be set as the predefined indices for comparison with the intra prediction mode index. Therefore, the predefined indices may be predefined in the source device 110 and the destination device 120.

In at least one implementation, referring to FIG. 2, the decoder module 1240 may compare the intra prediction mode index with the predefined indices to determine whether the intra prediction mode index is different from the predefined indices. The angle parameters of the predefined indices may be divisible by the predefined value.

The predefined value may be equal to a fractional sample precision parameter of an interpolation filter. In VVC, the fractional sample precision parameter of the interpolation filter may be predefined as 32 such that the predefined value may be equal to 32. Therefore, according to Table 1, the angle parameters of the predefined indices may include ±32, 64, 128, 256, and 512, and the predefined indices may include −14, −12, −10, −6, 2, 34, 66, 72, 76, 78, and 80.

Figure 7:
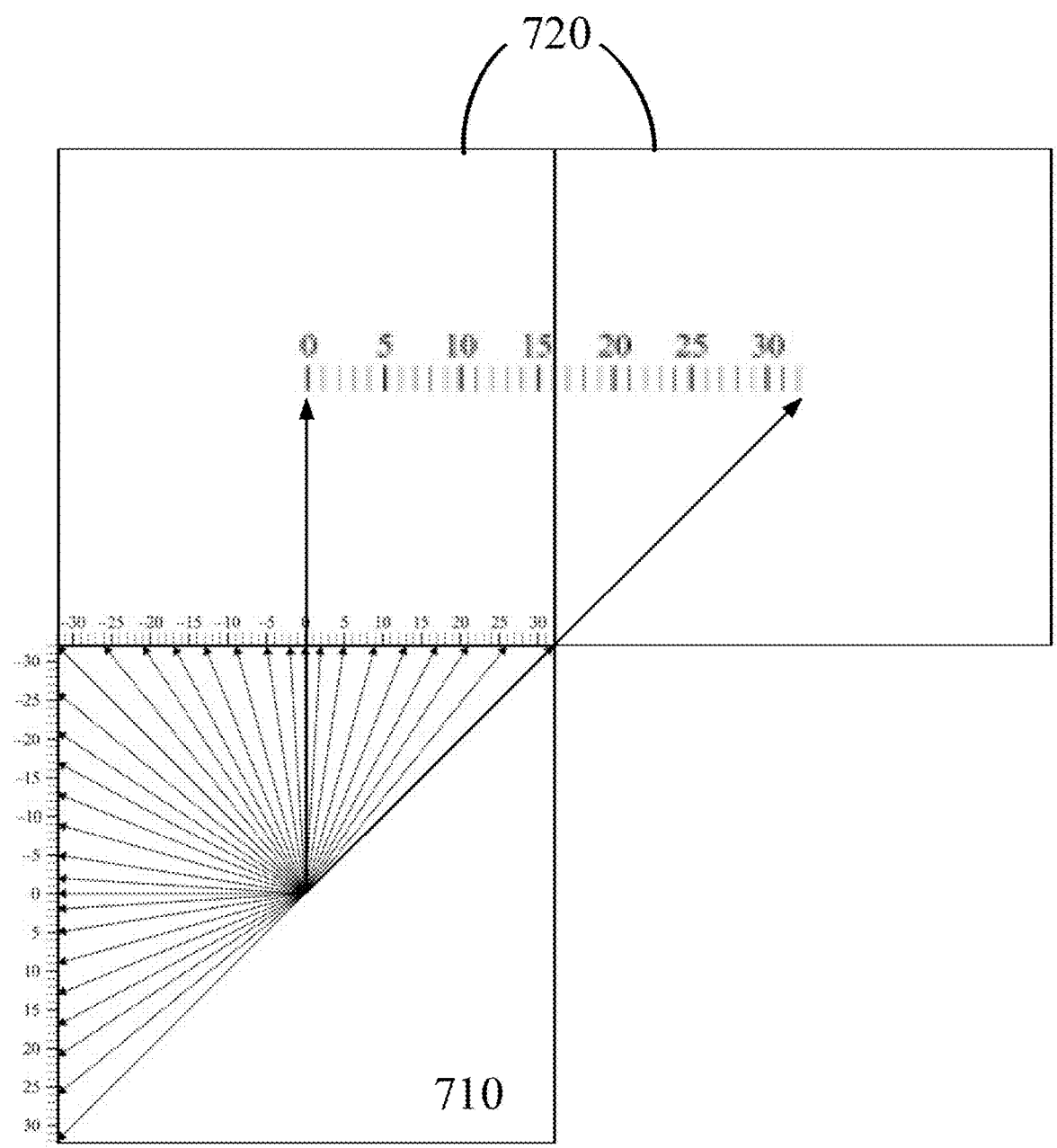
FIG. 7 illustrates a relationship between a plurality of intra candidate modes and a plurality of angle parameters based on the fractional sample precision parameter according to example implementations of the present disclosure.

In at least one implementation, the angle parameters of the predefined indices may be divisible by the fractional sample precision parameter since the predefined value is equal to the fractional sample precision parameter. FIG. 7 illustrates a relationship between a plurality of intra candidate modes and a plurality of angle parameters based on the fractional sample precision parameter according to the present disclosure.

In at least one implementation, a plurality of sample positions of a plurality of reference blocks 720 that neighbor a block unit 710 may be divided based on the fractional sample precision parameter. A position number for each of the sample positions directed by a corresponding one of the intra candidate modes may be set as the angle parameter for the corresponding one of the intra candidate modes.

The angle parameter of a vertical candidate mode may be equal to zero and the angle parameter of a diagonal mode from the bottom left to the top right may be equal to 32 when the fractional sample precision parameter is equal to 32. In at least one implementation, the sample position directed by a specific one of the intra candidate modes is a full-sample position of the reference blocks 720 when the angle parameter of the specific intra candidate mode is equal to zero or equal to a positive value or a negative value of the fractional sample precision parameter.

The sample position directed by the specific intra candidate mode is a fractional-sample position of the reference blocks 720 when the angle parameter of the specific intra candidate mode is not zero or the positive value and the negative value of the fractional sample precision parameter. The sample position directed by the intra prediction mode is a full-sample position of the reference blocks 720 when the angle parameter of the intra candidate mode selected from the wide-angle candidate modes is divisible by the fractional sample precision parameter. In other words, the sample position directed by the intra prediction mode is a fractional-sample position of the reference blocks 720 when the angle parameter of the intra candidate mode selected from the wide-angle candidate modes is not divisible by the fractional sample precision parameter.

At block 640, the decoder module 1240 may generate a plurality of filtered samples based on the reference samples by one of a plurality of sample filters selected based on the comparison result. The sample filter may include the interpolation filter and a reference filter.

In at least one implementation, referring to FIG. 2, the interpolation filter may be selected to filter the reference samples and generate the filtered samples when the decoder module 1240 determines that each of the predefined indices is different from the intra prediction mode index. The sample position directed by the intra prediction mode is a fractional-sample position when each of the predefined indices is different from the intra prediction mode index. Therefore, the interpolation filter may be selected to filter the reference samples to generate the filtered samples when the sample position directed by the intra prediction mode is a fractional-sample position.

The reference filter may be selected to filter the reference samples and generate the filtered samples when the decoder module 1240 determines that the intra prediction mode index is equal to one of the predefined indices. The sample position directed by the intra prediction mode is a full-sample position when the intra prediction mode index is equal to one of the predefined indices. Therefore, the reference filter may be selected to filter the reference samples and generate the filtered samples when the sample position directed by the intra prediction mode is a full-sample position. The filtered samples bypass the interpolation filter when the reference samples are filtered by the reference filter to generate the filtered samples.

In at least one implementation, referring to FIG. 2 and FIG. 5, there may be no reference sample located at a plurality of sample intersections between the fictitious horizontal line 563 and the component directions of the intra prediction mode when the intra prediction mode is directed from the block unit 510 toward the fractional-sample position of the reference blocks. Therefore, the decoder module 1240 may select some of the reference samples neighboring the sample intersections and generate the filtered reference samples according to interpolation based on the selected reference samples.

The component direction 533 may be directed from the component block 513 toward the fractional-sample position 5232 of the reference block 523. Therefore, the decoder module 1240 may select the reference samples in the reference blocks 522, 523, and/or other adjacent reference blocks to generate the filtered reference sample by interpolation based on the selected reference samples for the component block 513. The interpolation filter may include at least one of four-taps Gaussian filters (fG) and four-taps DCT filters (fC).

In at least one implementation, the plurality of sample intersections between the fictitious horizontal line 563 and the component directions of the intra prediction mode may be located at the full-sample positions when the intra prediction mode is directed from the block unit 510 toward the full-sample position of the reference samples. Therefore, the decoder module 1240 may directly select the reference samples without interpolation to generate the filtered reference samples.

The component direction 542 may be directed from the component block 515 toward the full-sample position 5251 of the reference block 525. Therefore, the decoder module 1240 may select the reference sample in reference block 525 for the component block 515. The selected reference block may be filtered by the reference filter. The reference filter may be a [1 2 1] three-taps smoothing filter applies to the reference samples in the selected reference block and other reference blocks neighboring the selected reference block.

At block 650, the decoder module 1240 may reconstruct the block unit according to the filtered reference samples along the mode direction of the intra prediction mode.

Referring to FIG. 1 and FIG. 2, the inter prediction unit 22224 may generate the predicted components for the component blocks in the block unit according to the filtered samples along the mode direction of the intra prediction mode. For example, each of the predicted components may be a predicted luminance components included in one of the component blocks when the decoder module 1240 reconstructs a plurality of luminance components in the block unit 510.

The first summer 2226 in the destination device 120 may add the predicted components to a plurality of residual components determined from the bitstream to reconstruct the block unit. The decoder module 1240 may reconstruct all of the other block units in the image frame for reconstructing the image frame and the video.

Figure 8:
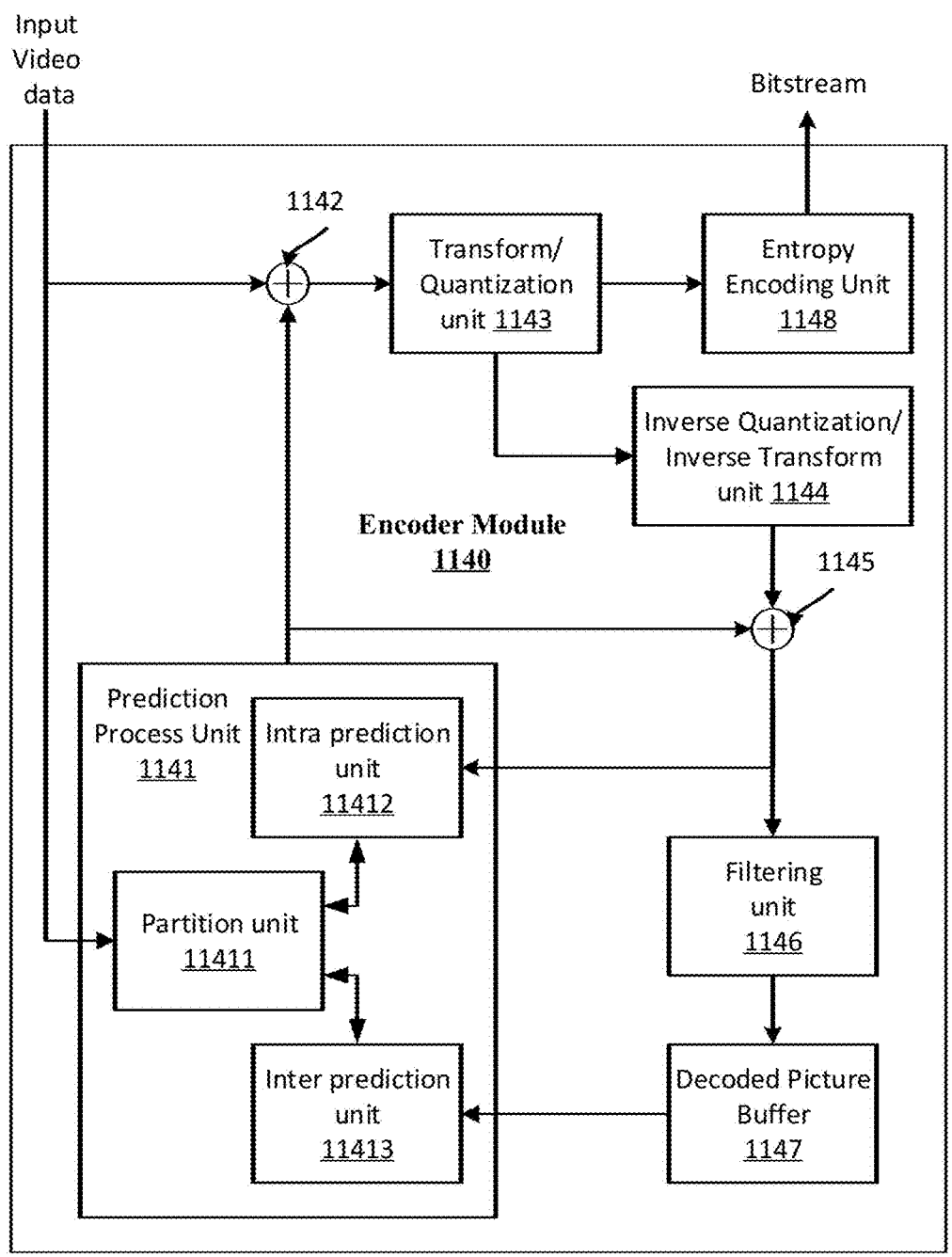
FIG. 8 illustrates a block diagram of an example encoder module of the source device in FIG. 1 according to an example implementation of the present application.

FIG. 8 illustrates an encoder module 1140 that is an implementation of the encoder module 114 in FIG. 1. The encoder module 1140 may include a prediction processor (e.g., a prediction process unit 1141), at least a first summer (e.g., a first summer 1142) and a second summer (e.g., a second summer 1145), a quantization/inverse transform processor (e.g., a transform/quantization unit 1143), an inverse quantization/inverse transform processor (e.g., an inverse quantization/inverse transform unit 1144), a filter (e.g., a filtering unit 1146), a decoded picture buffer (e.g., a decoded picture buffer 1147), and an entropy encoder (e.g., an entropy encoding unit 1148). The prediction process unit 1141 of the encoder module 1140 may further include a partition processor (e.g., a partition unit 11411), an intra prediction processor (e.g., an intra prediction unit 11412), and an inter prediction processor (e.g., an inter prediction unit 11413). The encoder module 1140 may receive the source video and encode the source video to output a bitstream.

The encoder module 1140 may receive a source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, the encoder module 1140 may perform additional sub-divisions of the source video. It should be noted that these implementations are generally applicable to video coding regardless of how the source video is partitioned prior to and/or during the encoding.

In at least one implementation, during the encoding process, the prediction process unit 1141 may receive a current image block of a specific one of the image frames during the encoding process. The current image block may be one of the luminance block and the at least one of the chrominance block in the specific image frame.

The partition unit 11411 may divide the current image block into multiple block units. The intra prediction unit 11412 may perform intra-predictive coding of a current block unit relative to one or more neighboring blocks in the same frame as the current block unit in order to provide spatial prediction. The inter prediction unit 11413 may perform inter-predictive coding of the current block unit relative to one or more blocks in one or more reference image blocks to provide temporal prediction.

In at least one implementation, the prediction process unit 1141 may select one of the coding results generated by the intra prediction unit 11412 and the inter prediction unit 11413 based on a mode selection method, such as a cost function. The mode selection method may be a rate-distortion optimization (RDO) process.

The prediction process unit 1141 may determine the selected coding result and provide a predicted block corresponding to the selected coding result to the first summer 1142 for generating a residual block and to the second summer 1145 for reconstructing the encoded block unit. The prediction process unit 1141 may further provide syntax elements such as motion vectors, intra mode indicators, partition information, and other syntax information to the entropy encoding unit 1148.

In at least one implementation, the intra prediction unit 11412 may intra predict the current block unit. The intra prediction unit 11412 may determine an intra prediction mode directed toward a reconstructed sample neighboring the current block unit in order to encode the current block unit.

In at least one implementation, the intra prediction unit 11412 may encode the current block unit using various intra prediction modes and the intra prediction unit or the prediction process unit 1141 may select an appropriate intra prediction mode from the tested modes. The intra prediction unit 11412 may encode the current block unit using a cross component prediction mode to predict one of the two chroma components of the current block unit based on the luma components of the current block unit. The intra prediction unit 11412 may predict a first one of the two chroma components of the current block unit based on the second of the two chroma components of the current block unit.

In at least one implementation, the inter prediction unit 11413 may inter predict the current block unit as an alternative to the intra prediction performed by the intra prediction unit 11412. The inter prediction unit 11413 may perform motion estimation to estimate motion of the current block unit for generating a motion vector.

The motion vector may indicate a displacement of the current block unit within the current image block relative to a reference block unit within a reference image block. The inter prediction unit 11413 may receive at least one reference image block stored in the decoded picture buffer 1147 and estimate the motion based on the received reference image blocks to generate the motion vector.

In at least one implementation, the first summer 1142 may generate the residual block by subtracting the prediction block determined by the prediction process unit 1141 from the original current block unit. The first summer 1142 may represent the component or components that perform this subtraction operation.

In at least one implementation, the transform/quantization unit 1143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform or a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 1143 may perform a scan of the matrix including the quantized transform coefficients. Alternatively, the entropy encoding unit 1148 may perform the scan.

In at least one implementation, the entropy encoding unit 1148 may receive a plurality of syntax elements from the prediction process unit 1141 and the transform/quantization unit 1143 including a quantization parameter, transform data, motion vectors, intra modes, partition information, and other syntax information The entropy encoding unit 1148 may encode the syntax elements into the bitstream.

In at least one implementation, the entropy encoding unit 1148 may entropy encode the quantized transform coefficients by performing CAVLC, CABAC, SBAC, PIPE coding or another entropy coding technique to generate an encoded bitstream. The encoded bitstream may be transmitted to another device (destination device 120 in FIG. 1) or archived for later transmission or retrieval.

In at least one implementation, the inverse quantization/inverse transform unit 1144 may apply inverse quantization and inverse transformation to reconstruct the residual block in the pixel domain for later use as a reference block. The second summer 1145 may add the reconstructed residual block to the prediction block provided from the prediction process unit 1141 in order to produce a reconstructed block for storage in the decoded picture buffer 1147.

In at least one implementation, the filtering unit 1146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not shown for brevity and may filter the output of the second summer 1145.

In at least one implementation, the decoded picture buffer 1147 may be a reference picture memory that stores the reference block for use by the encoder module 1140 to encode video, such as in intra or inter coding modes. The decoded picture buffer 1147 may include a variety of memory devices such as DRAM, including SDRAM, MRAM, RRAM), or other types of memory devices. The decoded picture buffer 1147 may be on-chip with other components of the encoder module 1140 or off-chip relative to those components.

Figure 9:
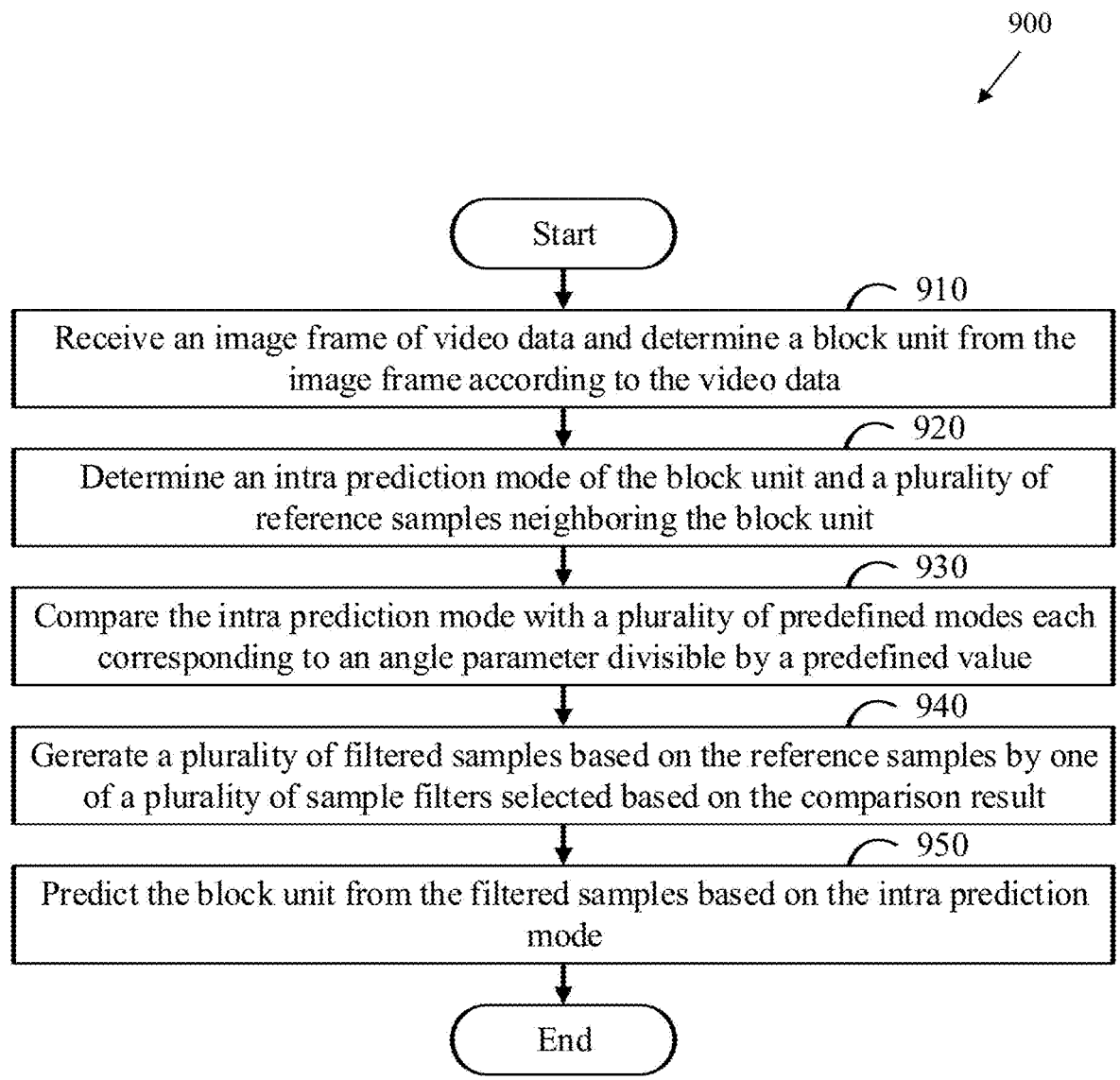
FIG. 9 illustrates a flowchart of an example prediction method for predicting a block unit according to an example implementation of the present disclosure.

FIG. 9 illustrates a method 900 for predicting a block unit by selecting a sample filter based on an intra prediction mode index of the block unit according to the present disclosure. The method 900 is only an example as there are a variety of ways to perform the method. The method 900 may be performed using the configurations illustrated in FIG. 1 and FIG. 8 and various elements are referenced in describing the method.

Each block shown in FIG. 9 represents one or more processes, methods, or subroutines performed. The order of blocks is only illustrative and may change. Additional blocks may be added or fewer blocks may be utilized without departing from the present disclosure.

At block 910, an encoder module may receive an image frame of video data and determine a block unit from the image frame according to the video data. The video data may be a video.

In at least one implementation, with reference to FIGS. 1 and 8, the source device 110 may receive the video via the source module 112. The encoder module 1140 may determine the image frame from the video and divide the image frame to determine the block unit.

In at least one implementation, the prediction process unit 1141 of the source device 110 may determine the block unit from the video via the partition unit 11411 and the encoder module 1140 may provide a plurality of partition indications into a bitstream based on a partition result of the partition unit 11411.

At block 920, the encoder module may determine an intra prediction mode of the block unit and determine a plurality of reference samples neighboring the block unit.

In at least one implementation, with reference to FIG. 8, the encoder module 1140 may select the intra prediction mode from a plurality of intra candidate modes of an intra mode list. Each of the intra candidate modes has intra mode indices that each indicates a corresponding one of the intra candidate modes. The intra candidate modes includes a plurality of wide-angle candidate modes and the intra mode indices of the wide-angle candidate modes may be a plurality of wide-angle mode indices.

In at least one implementation, the intra candidate modes may include a plurality of non-angular candidate modes and a plurality of angular candidate modes. The non-angular candidate modes may be a planar mode and a DC mode. The intra mode index of the planar mode may be equal to zero and the intra mode index of the DC mode may be equal to one.

In at least one implementation, each of the wide-angle candidate modes may be included in the angular candidate modes and other angular candidate modes different from the wide-angle candidate modes may be a plurality of angular default candidate modes. The intra mode indices of the angular candidate modes may include −14-−1 and 2-80 in Table 1 when the encoder module 1140 encodes the video based on a video coding standard, such as versatile video coding (VVC).

Each of the angular candidate modes has an angle parameter (IntraPredAngle). The angle parameters of the intra candidate modes may be predefined for encoding the video data and decoding the video data.

In at least one implementation, the prediction process unit 1141 may select one of the coding results based on a mode selection method, such as a cost function. The coding results may be generated by the intra prediction unit 11412 based on the intra candidate modes and generated by the inter prediction unit 11413 according to a plurality of motion vectors. The mode selection method may be a rate-distortion optimization (RDO) process.

In at least one implementation, the decoder module 1240 may further select a filtered method for the reference samples when the selected coding result is generated based on the intra prediction mode. The intra prediction unit 11412 may also select a filtered method for the reference samples based on the intra candidate modes before the prediction process unit 1141 compares the coding results.

In at least one implementation, with reference to FIG. 8, the encoder module 1140 may determine a plurality of blocks neighboring the block unit. Each of the neighboring blocks predicted prior to predicting the block unit may include a plurality of reference blocks for predicting the block unit.

Each of the reference blocks included in the predicted neighboring blocks may include a reference component. The reference components included in the reference blocks may be selected as the reference samples for predicting the block unit.

In at least one implementation, referring to FIG. 5, the block unit 510 may include the component blocks 511-516 and the predicted neighboring blocks may include the reference blocks 520 having the reference blocks 521-526. A plurality of fictitious horizontal lines 561-563 and a plurality of fictitious vertical lines 571-579 are shown in FIG. 5 only for illustrating the full-sample positions and it is unnecessary for the encoder module 1140 to determine the fictitious horizontal lines 561-563 and the fictitious vertical lines 571-579.

In at least one implementation, the reference samples may be located at a plurality of block centers of the reference blocks. The block centers may include a plurality of full-sample positions 5211-5261 determined based on a plurality of full-sample intersections between the fictitious horizontal line 563 and the fictitious vertical lines 573-575 and 577-579. The other positions in the reference blocks 521-526 may be determined as a plurality of fractional-sample positions based on a plurality of fraction sample intersections between a mode direction of the intra prediction mode and the fictitious horizontal line 563. Each of the fractional-sample positions may be located between two adjacent reference samples.

At block 930, the encoder module may compare the intra prediction mode with a plurality of predefined modes each corresponding to an angle parameter divisible by predefined value.

In at least one implementation, referring to FIG. 1, the intra candidate modes may be predefined in the source device 110 and the destination device 120. Some of the intra candidate modes may be set as predefined modes for comparison with the intra prediction mode. Therefore, the pre-defined modes may be predetermined in the source device 110 and the destination device 120.

The encoder module 1140 may compare the intra prediction mode with a plurality of predefined modes each corresponding to an angle parameter divisible by a predefined value. Referring to FIG. 8, the encoder module 1140 may compare the intra prediction mode with the predefined modes to determine whether the intra prediction mode is different from the predefined modes. The angle parameters of the predefined modes may be divisible by the predefined value. The predefined value may be equal to a fractional sample precision parameter of an interpolation filter. In VVC, the fractional sample precision parameter of the interpolation filter may be predefined as 32 such that the predefined value is equal to 32. Therefore, the angle parameters of the predefined modes according to Table 1 may include ±32, 64, 128, 256, and 512 and a plurality of predefined indices corresponding to the predefined modes may include −14, −12, −10, −6, 2, 34, 66, 72, 76, 78, and 80.

In at least one implementation, the angle parameters of the predefined indices may be divisible by the fractional sample precision parameter since the predefined value is equal to the fractional sample precision parameter. Referring to FIG. 7, a plurality of sample positions of a plurality of reference blocks 720 neighboring a block unit 710 may be divided based on the fractional sample precision parameter.

A position number for each of the sample positions directed by a corresponding one of the intra candidate modes may be set as the angle parameter for the corresponding one of the intra candidate modes. The sample position directed by a specific one of the intra candidate modes is a full-sample position of the reference blocks 720 when the angle parameter of the specific intra candidate mode is equal to zero or is a positive value or a negative value of the fractional sample precision parameter.

The sample position directed by the specific intra candidate mode is a fractional-sample position of the reference blocks 720 when the angle parameter of the specific intra candidate mode is not zero or the positive value and the negative value of the fractional sample precision parameter. The sample position directed by the intra prediction mode is a full-sample position of the reference blocks 720 when the angle parameter of the intra candidate mode selected from the wide-angle candidate modes is divisible by the fractional sample precision parameter. In other words, the sample position directed by the intra prediction mode is a fractional-sample position of the reference blocks 720 when the angle parameter of the intra candidate mode selected from the wide-angle candidate modes is not divisible by the fractional sample precision parameter.

At block 940, the encoder module 1140 may generate a plurality of filtered samples based on the reference samples from one of a plurality of sample filters selected based on the comparison result. The sample filter may include the interpolation filter and a reference filter.

Referring to FIG. 8, the interpolation filter may be selected to filter the reference samples in order to generate the filtered samples when the encoder module 1140 determines that each of the predefined modes is different from the intra prediction mode. The sample position directed by the intra prediction mode is a fractional-sample position when each of the predefined modes is different from the intra prediction mode. Therefore, the interpolation filter may be selected to filter the reference samples in order to generate the filtered samples when the sample position directed by the intra prediction mode is a fractional-sample position.

In at least one implementation, the reference filter may be selected to filter the reference samples in order to generate the filtered samples when the encoder module 1140 determines that the intra prediction mode is identical to one of the predefined modes. The sample position directed by the intra prediction mode is a full-sample position when the intra prediction mode is identical to one of the predefined modes.

Therefore, the reference filter may be selected to filter the reference samples in order to generate the filtered samples when the sample position directed by the intra prediction mode is a full-sample position. The filtered samples bypass the interpolation filter when the reference samples are filtered by the reference filter in order to generate the filtered samples.

Referring to FIG. 5 and FIG. 8, there may be no reference sample located at a plurality of sample intersections between the fictitious horizontal line 563 and the component directions of the intra prediction mode when the intra prediction mode is directed from the block unit 510 toward the fractional-sample position of the reference blocks. Therefore, the encoder module 1140 may select some of the reference samples neighboring the sample intersections and generate the filtered reference samples by interpolation based on the selected reference samples.

The component direction 533 may be directed from the component block 513 toward the fractional-sample position 532 of the reference block 523. Therefore, the encoder module 1140 may select the reference samples in the reference blocks 522, 523 and/or other adjacent reference blocks to generate the filtered reference samples by interpolation based on the selected reference samples for the component block 513. The interpolation filter may include at least one of four-taps Gaussian filters (fG) and four-taps DCT filters (fC).

The plurality of sample intersections between the fictitious horizontal line 563 and the component directions of the intra prediction mode may be located at the full-sample positions when the intra prediction mode is directed from the block unit 510 toward the full-sample position of the reference samples. Therefore, the encoder module 1140 may directly select the reference samples without interpolation to generate the filtered reference samples.

The component direction 542 may be directed from the component block 515 toward the full-sample position 5251 of the reference block 525. Therefore, the encoder module 1140 may select the reference sample in the reference block 525 for the component block 515. The selected reference block may be filtered by the reference filter. The reference filter may be a [1 2 1] three-taps smoothing filter applicable to the reference samples in the selected reference block and other reference blocks neighboring the selected reference block.

At block 950, the encoder module may predict the block unit from the filtered samples based on the intra prediction mode. Referring to FIGS. 1 and 8, the intra prediction unit 11412 may generate a predicted component for the component blocks in the block unit based on the intra prediction mode.

The first summer 1142 of the encoder module 1140 in the source device 110 may generate a plurality of residual samples based on the predicted components and provide a bitstream to the destination device 120 including a plurality of coefficients corresponding to the residual samples. The encoder module 1140 may predict all other block units in the image frame for predicting the image frame and the video.

From the above description, it can be seen that various techniques may be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts.

As such, the described implementations are to be considered in all respects as illustrative and not restrictive. It should also be understood that the present disclosure is not limited to the particular implementations described above but that many rearrangements, modifications, and substitutions are possible without departing from the scope of the present disclosure.

What is claimed is:

1. A method of decoding a bitstream by an electronic device, the method comprising:
   receiving an image frame of the bitstream;
   determining a block unit from the received image frame;
   determining an intra prediction mode index of the block unit based on the bitstream, the intra prediction mode index corresponding to one of a plurality of wide-angle candidate modes each having an angle parameter;
   determining a plurality of reference samples neighboring the block unit;
   determining whether the determined intra prediction mode index is equal to at least one of a plurality of predefined indices each corresponding to one of a plurality of predefined wide-angle modes in the plurality of wide-angle candidate modes;
   generating a plurality of filtered samples by an interpolation filter based on the determined plurality of reference samples when the determined intra prediction mode index is not equal to the at least one of the plurality of predefined indices; and
   reconstructing the determined block unit based on the generated plurality of filtered samples along a mode direction of the determined intra prediction mode index,
   wherein the angle parameters of the plurality of predefined wide-angle modes are divisible by a predefined value.

2. The method according to claim 1, further comprising:
   generating the plurality of filtered samples based on the determined plurality of reference samples by a reference filter different from the interpolation filter when the determined intra prediction mode index is equal to the at least one of the plurality of predefined indices.

3. The method according to claim 1, wherein the plurality of filtered samples bypasses the interpolation filter when the determined intra prediction mode index is equal to the at least one of the plurality of predefined indices.

4. The method according to claim 1, wherein:
   the determined block unit includes a plurality of component blocks; and
   each of the plurality of component blocks is directed along the mode direction toward a corresponding one of the determined plurality of reference samples when the determined intra prediction mode index is equal to the at least one of the plurality of predefined indices.

5. The method according to claim 4, wherein each of the plurality of component blocks is directed along the mode direction toward a fractional-sample position between two adjacent reference samples of the determined plurality of reference samples when the determined intra prediction mode index is not equal to the at least one of the plurality of predefined indices.

6. The method according to claim 1, wherein each of the plurality of predefined wide-angle modes is directed from the determined block unit toward a full-sample position in the determined plurality of reference samples.

7. The method according to claim 1, wherein the predefined value is equal to a fractional sample precision parameter of the interpolation filter.

8. An electronic device for decoding a bitstream, the electronic device comprising:
   at least one processor; and
   a storage device coupled to the at least one processor and storing a set of instructions which, when executed by the at least one processor, causes the at least one processor to:
   receive an image frame of the bitstream;
   determine a block unit from the received image frame;
   determine an intra prediction mode index of the determined block unit based on the bitstream, the determined intra prediction mode index corresponding to one of a plurality of wide-angle candidate modes each having an angle parameter;
   determine a plurality of reference samples neighboring the block unit;
   determine whether the determined intra prediction mode index is equal to at least one of a plurality of predefined indices each corresponding to one of a plurality of predefined wide-angle modes in the plurality of wide-angle candidate modes;
   generate a plurality of filtered samples by an interpolation filter based on the determined plurality of reference samples when the determined intra prediction mode index is not equal to the at least one of the plurality of predefined indices; and
   reconstruct the determined block unit based on the generated plurality of filtered samples along a mode direction of the intra prediction mode index,
   wherein the angle parameters of the plurality of predefined wide-angle modes are divisible by a predefined value.

9. The electronic device according to claim 8, wherein the set of instructions, when executed by the at least one processor, further causes the at least one processor to:

generate the plurality of filtered samples based on the determined plurality of reference samples by a reference filter different from the interpolation filter when the determined intra prediction mode index is equal to the at least one of the plurality of predefined indices.

10. The electronic device according to claim 8, wherein the plurality of filtered samples bypasses the interpolation filter when the plurality of reference samples is filtered by the reference filter to generate the plurality of filtered samples.

11. The electronic device according to claim 8, wherein:
the determined block unit includes a plurality of component blocks; and
each of the plurality of component blocks is directed along the mode direction toward a corresponding one of the determined plurality of reference samples when the intra prediction mode index is equal to the at least one of the plurality of predefined indices.

12. The electronic device according to claim 11, wherein each of the plurality of component blocks is directed along the mode direction toward a fractional-sample position between two adjacent reference samples of the determined plurality of reference samples when the determined intra prediction mode index is not equal to at least one of the plurality of predefined wide-angle indices.

13. The electronic device according to claim 8, wherein the predefined value is equal to a fractional sample precision parameter of the interpolation filter.

14. A method of decoding a bitstream by an electronic device, the method comprising:
receiving an image frame of the bitstream;
determining a block unit from the received image frame;
determining an intra prediction mode index of the determined block unit based on the bitstream;
determining a plurality of reference samples neighboring the determined block unit;
comparing the determined intra prediction mode index with a plurality of predefined indices each corresponding to an angle parameter divisible by a predefined value;
generating a plurality of filtered samples by one of a plurality of sample filters selected based on the comparison, the plurality of filtered samples determined based on the determined plurality of reference samples; and
reconstructing the determined block unit based on the generated plurality of filtered samples and the determined intra prediction mode index.

15. The method according to claim 14, wherein the selected one of the plurality of sample filters comprises a reference filter when the determined intra prediction mode index is equal to at least one of the plurality of predefined indices.

16. The method according to claim 15, wherein the selected one of the plurality of sample filters is an interpolation filter different from the reference filter when the determined intra prediction mode index is not equal to the at least one of the plurality of predefined indices.

17. The method according to claim 16, wherein the generated plurality of filtered samples bypasses the interpolation filter when the determined intra prediction mode index is equal to the at least one of the plurality of predefined indices.

18. The method according to claim 14, wherein:
the determined block unit includes a plurality of component blocks; and
each of the plurality of component blocks is directed along the mode direction toward a corresponding one of the determined plurality of reference samples when the determined intra prediction mode index is equal to at least one of the plurality of predefined indices and corresponds to an angular intra mode.

19. The method according to claim 18, wherein each of the plurality of component blocks is directed along the mode direction toward a fractional-sample position between two adjacent reference samples of the determined plurality of reference samples when the determined intra prediction mode index is not equal to the at least one of the plurality of predefined indices and corresponds to the angular intra mode.

20. The method according to claim 14, wherein the predefined value is equal to 32.

* * * * *